(12) United States Patent
Kalamegham et al.

(10) Patent No.: US 7,444,268 B1
(45) Date of Patent: Oct. 28, 2008

(54) METHOD AND APPARATUS FOR IDENTIFYING A DRIFT IN A QUANTIZED SIGNAL IN A COMPUTER SYSTEM

(75) Inventors: Praveen Kalamegham, Austin, TX (US); Nathan D. Sportsman, Austin, TX (US); Keith A. Whisnant, LaJolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 420 days.

(21) Appl. No.: 11/205,430

(22) Filed: Aug. 16, 2005

Related U.S. Application Data

(63) Continuation-in-part of application No. 10/809,721, filed on Mar. 25, 2004.

(51) Int. Cl.
G06F 15/00 (2006.01)

(52) U.S. Cl. .......... 702/189; 702/57; 702/179; 702/191; 714/25; 714/48; 714/699; 708/827; 327/307; 330/9; 331/17; 324/601

(58) Field of Classification Search .......... 702/57, 702/179, 189, 191; 708/827; 327/307; 330/9; 331/17; 324/601; 714/25, 48, 699
See application file for complete search history.

(56) References Cited

U.S. PATENT DOCUMENTS 3,925,643 A * 12/1975 Roantree et al. .......... 701/205
5,218,486 A * 6/1993 Wilkinson .......... 360/27
5,784,297 A * 7/1998 O'Brien et al. .......... 702/181
6,147,501 A * 11/2000 Chodora .......... 324/601
6,377,840 B1 * 4/2002 Gritsenko et al. .......... 600/476
6,430,522 B1 * 8/2002 O'Brien et al. .......... 702/181
6,961,862 B2 * 11/2005 Best et al. .......... 713/401
7,023,581 B2 * 4/2006 Soler et al. .......... 358/1.9

OTHER PUBLICATIONS

Sandoz et al., 'Performance Improvement of a Binary Quantized All-Digital Phase-Locked Loop with a New Aided-Acquisition Technique', Dec. 1984, IEEE Publication, vol. Com-32, No. 12, pp. 1269-1276.*

* cited by examiner

Primary Examiner—Jonh E. Barlow
Assistant Examiner—Elias Desta
(74) Attorney, Agent, or Firm—Park, Vaughan & Fleming LLP

(57) ABSTRACT

One embodiment of the present invention provides a system that identifies a drift in a signal in a computer system. During operation, the system receives a sequence of quantized signal values of the signal. Next, the system generates a statistical distribution based on the sequence of quantized signal values, wherein the statistical distribution is generated using a set of counters, wherein each counter keeps track of the number of occurrences of an associated quantized signal value. The system periodically adjusts the counters by multiplying each counter by a compression factor if the system determines the sum of the set of counters is greater than or equal to a threshold. The system identifies the drift in the signal by comparing the statistical distribution with a reference distribution of the quantized signal values, wherein the reference distribution is associated with normal operation of the computer system.

21 Claims, 3 Drawing Sheets

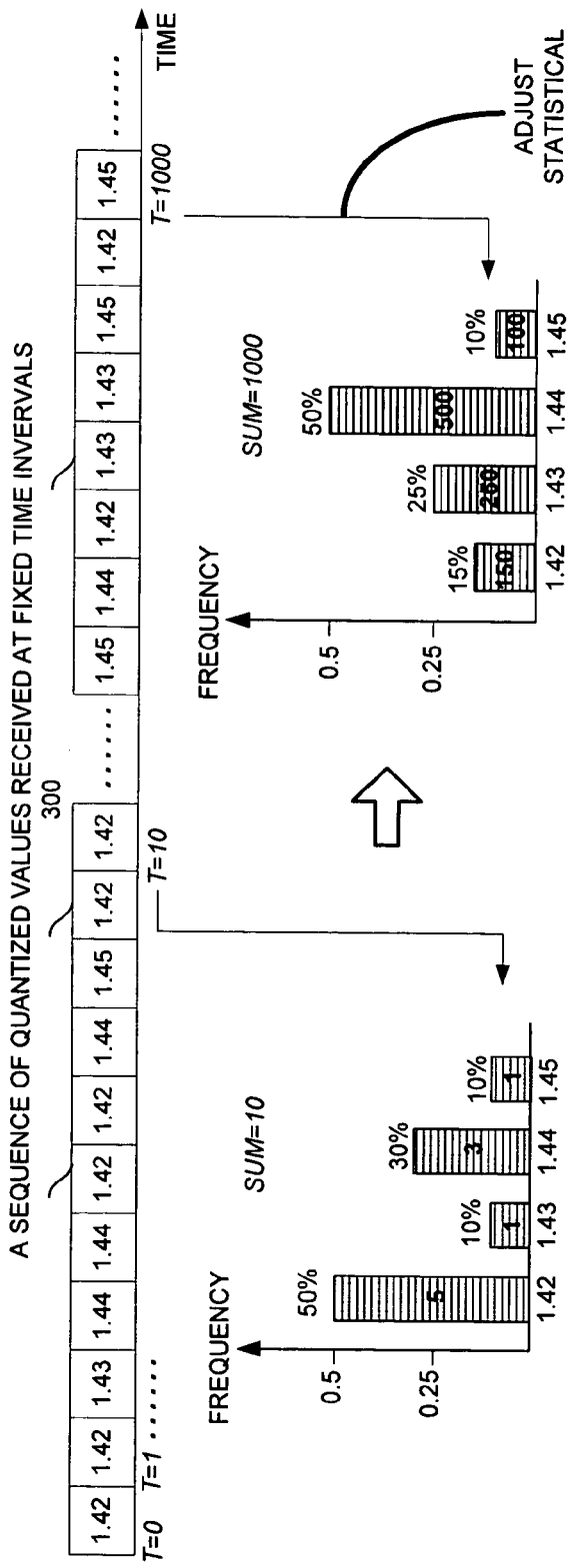
FIG. 3A STATISTICAL DISTRIBUTION AT T=10
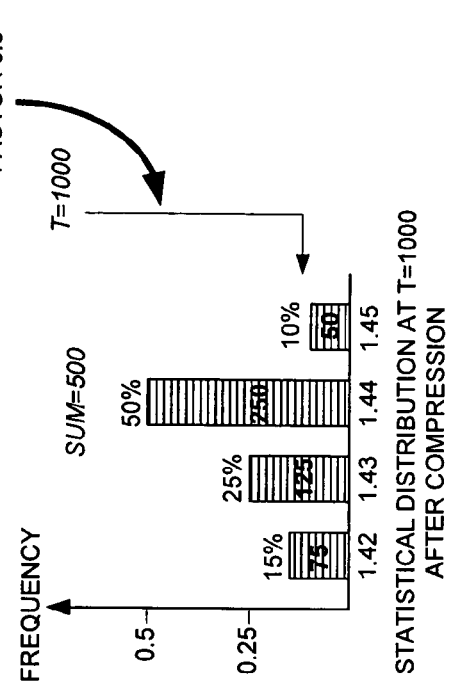
FIG. 3B STATISTICAL DISTRIBUTION AT T=1000 BEFORE COMPRESSION
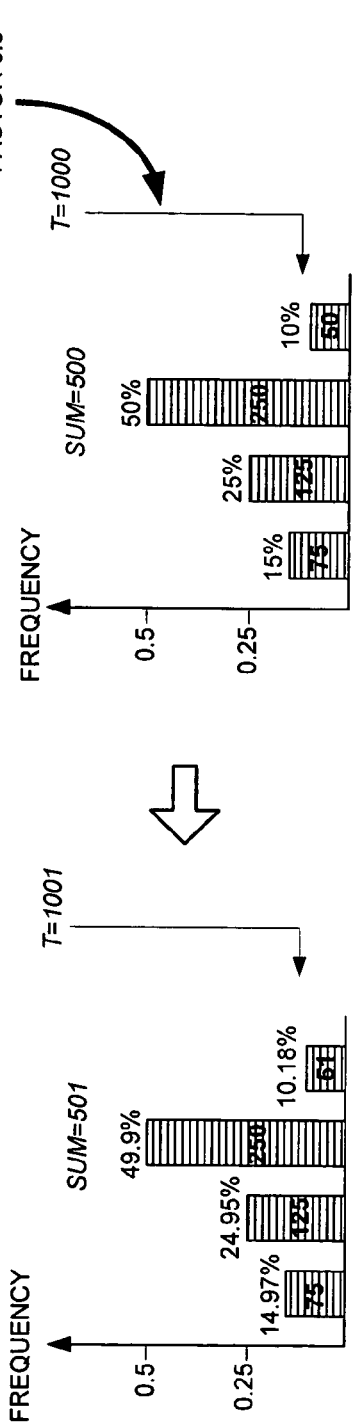
FIG. 3C STATISTICAL DISTRIBUTION AT T=1000 AFTER COMPRESSION
FIG. 3D STATISTICAL DISTRIBUTION AT T=1001 AFTER COMPRESSION

METHOD AND APPARATUS FOR IDENTIFYING A DRIFT IN A QUANTIZED SIGNAL IN A COMPUTER SYSTEM

RELATED APPLICATION

This application is a continuation-in-part of, and hereby claims priority under 35 U.S.C. §120 to, U.S. patent application Ser. No. 10/809,721, entitled, "TECHNIQUE FOR DETECTING CHANGES IN SIGNALS THAT ARE MEASURED BY QUANTIZATION," by inventors Kenneth C. Gross and Keith A. Whisnant filed on 25 Mar. 2004. Furthermore, the above-listed reference is hereby incorporated by reference herein to provide details of how a sliding window technique can be used to identify a drift in a quantized signal.

BACKGROUND

1. Field of the Invention

The present invention relates to techniques for detecting problems in computer systems. More specifically, the present invention relates to a method and an apparatus for identifying a drift in a quantized signal which can be used to detect problems in a computer system.

2. Related Art

Rapid advances in computing technology presently make it possible to perform trillions of computational operations each second on data sets that are sometimes as large as a trillion bytes in a large computer system. These advances can be largely attributed to the exponential increase in the density and complexity of silicon chips.

Unfortunately, in conjunction with these advances, a computer system's tolerance to environmental parameter changes has decreased dramatically.

For example, in a CPU, an important environmental parameter is its core voltage, vCore, which specifies the normal logic high voltage. Transistors within a CPU typically work within a tolerance range of 10% of the nominal vCore. A vCore value beyond the tolerance range can permanently damage the transistor, which can cause CPU failure.

The nominal vCore has been consistently decreasing with increasing transistor density which has pushed vCore below 2V in the current generation of microprocessors. As a result, the actual range of permissible operating voltages has become very small, and even a small drift in the vCore can lead to disastrous consequences.

If we can detect a drift in vCore, we can take preventive measures to protect the system before vCore drifts out of the tolerance range and causes a catastrophic system failure. For example, when a drift is detected, the system can be shut down for maintenance and the CPU can be replaced.

Hence what is need is a method and apparatus for identifying a drift in a signal in a computer system.

SUMMARY

One embodiment of the present invention provides a system that identifies a drift in a signal in a computer system. During operation, the system receives a sequence of quantized signal values of the signal. Next, the system generates a statistical distribution based on the sequence of quantized signal values, wherein the statistical distribution is generated using a set of counters, wherein each counter keeps track of the number of occurrences of an associated quantized signal value. The system periodically adjusts the counters by multiplying each counter by a compression factor if the system determines the sum of the set of counters is greater than or equal to a threshold. The system identifies the drift in the signal by comparing the statistical distribution with a reference distribution of the quantized signal values, wherein the reference distribution is associated with normal operation of the computer system.

In a variation on this embodiment, the system generates the statistical distribution by incrementing a counter associated with a quantized signal value when the quantized signal value is received. Next, the system computes a frequency value associated with the quantized signal value by dividing the counter by the sum of all the counters in the set of counters. Note that using counters to keep track of the statistical distribution eliminates the need for storing the quantized signal values in a buffer.

In a variation on this embodiment, multiplying the set of counters by the compression factor does not change the statistical distribution.

In a variation on this embodiment, the system uses a compression factor between 0 and 1. When a compression factor closer to 0 is used, the system reduces the weight of the previously received quantized signal values in computing the statistical distribution, thereby making the method more sensitive to new signal values. In contrast, when a compression factor closer to 1 is used, the system increases the weight of the previously received quantized signal values in computing the statistical distribution, thereby making the method less sensitive to new signal values.

In a further variation on this embodiment, the system obtains the reference statistical distribution by computing a mean and a variance of a frequency associated with a quantized value for a predetermined period of time during normal system operation prior to identifying a drift in the signal.

In a variation on this embodiment, the system identifies the drift in the signal by using a Sequential Probability Ratio Test (SPRT) to determine whether the sequence of quantized signal values adheres to a reference distribution or not.

In a further variation on this embodiment, the system tunes the compression factor so that the SPRT test meets user-specified false-alarm and missed-alarm probability targets. Note that a false-alarm occurs when a drift determination is made under non-drift conditions and a missed-alarm occurs when a non-drift determination is made under drift conditions.

BRIEF DESCRIPTION OF THE FIGURES

FIGS. 3A, 3B, 3C, and 3D illustrate how compression can be used to adjust a statistical distribution for a sequence of quantized signal values in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Quantization Error

Figure 1:
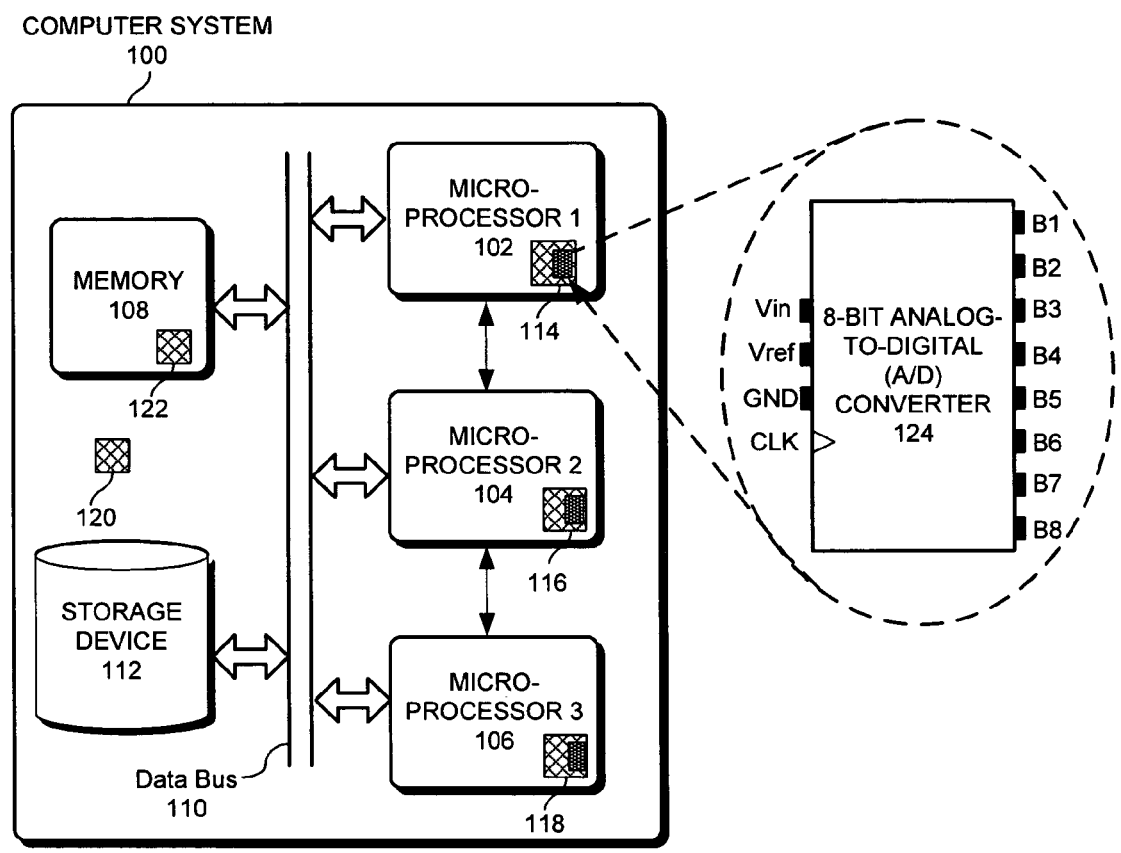
FIG. 1 illustrates a computer system with sensors that detect signals in different parts of the computer system in accordance with an embodiment of the present invention.

FIG. 1 illustrates a computer system with sensors that detect signals in different parts of the computer system in accordance with an embodiment of the present invention.

Computer system 100 comprises multiple processors 102, 104, and 106. Processors 102, 104, and 106 communicate with memory 108 through data bus 110. Memory 108 can include any type of memory that can store code and data for execution by the processors 102, 104, and 106. This includes, but is not limited to, static random access memory (SRAM), dynamic RAM (DRAM), magnetic RAM (MRAM), non-volatile RAM (NVRAM), flash memory, and read only memory (ROM).

Processors 102, 104, and 106 communicate with storage device 112 through data bus 110. Storage device 112 can include any type of non-volatile storage device that can be coupled to a computer system. This includes, but is not limited to, magnetic, optical, and magneto-optical storage devices, as well as storage devices based on flash memory and/or battery-backed up memory.

Processors 102, 104, and 106 can include any type of processor, including, but not limited to, a microprocessor, a mainframe computer, a digital signal processor, a personal organizer, a device controller and a computational engine within an appliance.

In order to monitor a signal associated with the operation of the computing system 100, several sensors 114, 116, 118, 120, and 122 can be selectively positioned throughout the computing system 100. These sensors 114, 116, 118, 120, and 122 measure signals, such as voltage, current, and temperature, within specific components in the computer system. For example, sensor 122 can be used to monitor a particular voltage provided to a bank of storage cells (not shown) in memory 108.

In one embodiment, physical sensors 114, 116, and 118 residing inside processors 102, 104, and 106, respectively, are used to detect and identify drift in the vCore of the processors. Each sensor 114, 116 or 118 includes an analog-to-digital (A/D) converter 124, which is shown in a close-up view in FIG. 2. A/D converter 124 converts continuous analog signals to discrete, digital values. For example, A/D converter 124 converts the analog vCore signal of processor 102 into a digital format which can be processed by processor 102.

Further, A/D converter 124 shown in FIG. 1 is an 8-bit A/D converter, which means that the digital output generated by A/D converter 124 is represented using 8 bits. Specifically, it samples the analog signal at pin Vin at a rate determined by a clock signal CLK, and produces an 8-bit digital output on pins B1 to B8. Note that A/D converter 124 can generate $2^8$, or 256, discrete values. In comparison, an A/D converter with a 4-bit data output can produce $2^4$, or 16, discrete values. Conversely, a 10-bit A/D converter can produce $2^{10}$, or 1024.

The process of representing a continuous, analog signal with discrete values is known as "quantization." For example, the 8-bit A/D converter output representing a vCore signal is rounded off to the nearest 10 mV, with quantized values of 1.60 V, 1.61 V, 1.62 V, 1.63 V, etc. Note that an analog voltage of 1.614V is represented by the 8-bit A/D converter as 1.61 V (in binary form). The round-off error of 4 mV between the analog input and its quantized value representation is referred to as "quantization error." A large quantization error can make it difficult to detect subtle changes in vCore before a significant drift has taken place.

Histogram of Quantized Values

To overcome the quantization effects of the low resolution 8-bit A/D converter, one can take advantage of the fact that for a microprocessor in normal operation, the vCore value is normally flat over time.

Note that not all 256 output levels of an 8-bit A/D converter are used. Instead, only a small number of quantized values are expected from A/D converter outputs to represent the relative stationary vCore value (e.g., A/D output values are either 1.63 V, 1.64 V, or 1.65 V). A statistical distribution in the form of a moving histogram can be constructed in a way such that, for each sample received, the occurrences of each quantized value are updated, and the occurrence frequency of each quantized value over the total number of samples received are recalculated. If a vCore signal is stationary, then the histogram for the quantized values should not change over time.

On the other hand, if a drift in vCore occurs, the moving histogram can show that a particular quantized value is occurring at an increasing frequency over time at the expense of some other quantized values are decreasing in frequencies. The fact that the statistical distributions are no longer constant in time indicates that the distribution is changing, which means that the vCore signal is drifting.

Statistical techniques can be used to determine when the change in distribution is significant, and this determination can be used to trigger the calculation of an index to assess the severity (steepness) of the vCore ramp. Specifically, a Sequential Probability Ratio Test (SPRT) can be used to detect when a vCore signal starts drifting from normal.

Sequential Probability Ratio Test (SPRT)

To determine whether the current statistical distribution is statistically different from the mean reference statistical distribution, in which case the signal of interest would be determined to be drifting, the following SPRT expression may be used:

$$SPRT(i) = SPRT(i-1) + \left[ \frac{(x_i - M_0)^2}{2\sigma^2} - \frac{(x_i - M_1)^2}{2\sigma^2} \right],$$

where i represents the sample number of the newly sampled quantized value for a particular quantized value, $x_i$ represents the current frequency of the quantized value (i.e., the frequency of the quantized value calculated immediately after the sampling of this value i), $M_0$ represents the "trained" mean frequency of the reference distribution, $M_1$ represents a mean deviant frequency value considered to be "bad", and $\sigma^2$ represents a "trained" variance of the reference distribution.

The SPRT statistic expressed above provides a quantitative framework that enables one to decide between two hypotheses:

1. Nonfailure hypothesis: The current statistic of the quantized value belongs to the reference distribution learned during the training period. The reference distribution is characterized by the mean $M_0$ and variance $\sigma^2$.
2. Failure hypothesis: The current statistic of the quantized value belongs to a deviant distribution. The deviant distribution is characterized by the mean $M_1$ and variance $\sigma^2$.

The mean of deviant distribution $M_1$ may be chosen so as to have a certain absolute value or percentage offset from $M_0$. For example, if the "trained" mean frequency $M_0$ of a particular quantized value is 0.25, then $M_1$ may be set to $M_0+0.08$, or 0.33. This fixed offset may be derived based on empirical studies, or it may be specified by a user.

In one embodiment of the present invention, two SPRT calculations are performed for every new quantized value received: one to determine whether the signal of interest is "drifting up," and one to determine whether the signal of interest is "drifting down." To determine if the signal is "drifting up," $M_1$ can be set to an absolute value or a percentage above $M_0$, and to determine if the signal is "drifting down," $M_1$ can be set to an absolute value or a percentage below $M_0$. The value to which $M_1$ is set may depend on how wide a range of variation is considered as being acceptable by the user.

Accordingly, in one embodiment, two SPRT statistics are computed for each new quantized value received. To determine whether a computed SPRT value is indicative of the signal of interest "drifting," the value is compared to values A (upper or positive threshold) and B (lower or negative threshold) using the following expression:

$$A = \ln\left(\frac{\beta}{1-\alpha}\right), \text{ and}$$

$$B = \ln\left(\frac{1-\beta}{\alpha}\right),$$

where $\alpha$ is the desired false alarm probability (the probability of deciding Failure hypothesis when the Nonfailure hypothesis holds) and $\beta$ is the desired missed alarm probability (the probability of deciding the Nonfailure hypothesis when the Failure hypothesis holds). Note that statistical tests typically do not produce results with 100% confidence (i.e., $\alpha$ or $\beta$ equal to zero). It is not surprising that setting $\beta$ to zero (no missed alarms) in the above expression produces a lower bound of negative infinity, which means that the SPRT can never decide with 100% confidence whether the bin frequency conforms to the reference distribution. In one embodiment of the present invention, $\alpha=0.001$ and $\beta=0.005$ are set as effective false/missed alarm probabilities.

The initial SPRT statistic for sample zero is set to zero (SPRT(0)=0). When the SPRT statistic crosses the lower threshold B, then enough observations have been seen to accept the Nonfailure hypothesis (observations come from the reference distribution). Conversely, when the SPRT statistic crosses the upper threshold A, then enough observations have been seen to accept the Failure hypothesis (observations come from the deviant distribution). Finally, when the SPRT statistic is between A and B, then no decision can be made at sample i regarding whether the Nonfailure or Failure hypothesis holds. Monitoring continues with the next sample, after which the updated SPRT statistic is compared to the A and B threshold values.

Sliding Window

As more and more samples are added to the histogram, the individual quantized value counts continue to increase. This builds up "inertia" in the associated quantized value frequencies, which impacts the time required to detect deviations from a nominal distribution. The greater the inertia, the longer it takes for an associated frequency to change when a stationary signal starts a drift. In order to reduce the inertia effect in detecting a signal drift, the statistical distribution can be computed over a "sliding window," wherein the sliding window contains the samples received in a predetermined period of time (e.g. a 7 day period moving histogram reflects vCore values observed over the last 7 days).

The sliding window technique uses a fixed size rotational array, in which each received quantized value is stored as an element of the array. Once the array is full, the oldest values are replaced with the newly received values. The values removed from the array are used to decrement the corresponding quantized value count. Since the older samples are replaced by new samples, the effect of inertia buildup is reduced.

Memory Requirement

Although the sliding window method reduces inertia buildup in the histogram approach, it requires a large amount of memory to store the samples received over a period of time. All the samples have to be queued in memory so that the order in which they arrive is recorded for updating the sliding window. Furthermore, the memory requirement is significantly more for a computer system that comprises many monitored signals (e.g. a server with multiple microprocessors), because one sliding window has to be assigned for each signal.

Additionally, detecting a drift in a signal is often required in environments where low memory usage is highly desirable, such as in a server.

Process for Identifying a Drift in a Signal

Figure 2:
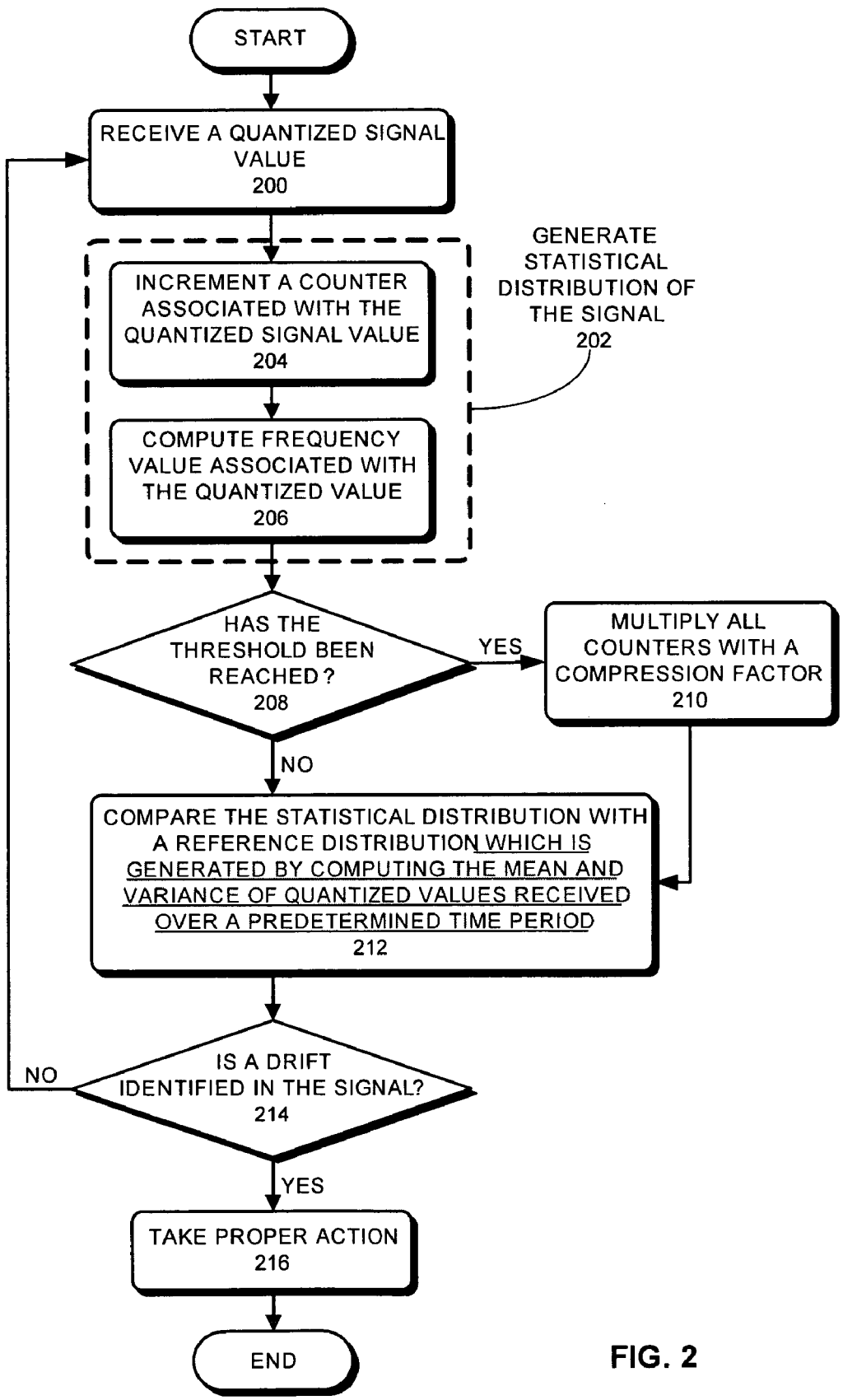
FIG. 2 presents a flow chart illustrating a process of identifying a drift in a signal in a computer system in accordance with an embodiment of the present invention.

FIG. 2 presents a flow chart illustrating a process of identifying a drift in a signal in a computer system in accordance with an embodiment of the present invention.

The process typically begins by receiving a quantized signal value for the signal being monitored (step 200). In one embodiment of the present invent, the quantized signal values are received continuously at constant time intervals.

Next, the system generates a statistical distribution of the signal based on the received sample (step 202). Note that the statistical distribution is generated using a set of counters, wherein each counter keeps track of the number of occurrences of an associated quantized signal value.

Specifically, the system increments the counter associated with the received quantized signal value (step 204).

The system periodically adjusts the frequency value associated with each quantized signal value by dividing the associated counter by the sum of all the counters in the set of counters (step 206). Note that the sum of all the counters in the set of counters represents the total number of samples received.

The system then determines if the sum of the set of counters is greater than or equal to a predetermined threshold value (step 208). In one embodiment of the present invention, the system uses a threshold of 10,080, which corresponds to 7 days of samples collected at 1 minute intervals.

When the threshold is reached, the system adjusts the statistical distribution by multiplying each counter in the set of counters by a compression factor (step 210). Note that, by doing this, the sum of all of the counters is also compressed by the same compression factor. As a result, each particular quantized value is represented in the statistical distribution using a smaller number of samples. Furthermore, note that multiplying each counter by the compression factor does not change the statistical distribution for each associated quantized value.

In one embodiment of the present invention, the following expression is used to adjust the total number of observed samples:

totalNumberObservedSamples=totalNumberObservedSamples*f, and for each quantized value, x, in the statistical histogram, the following expression is used to adjust the associated counter:

count[x]=count[x]*f (0<f<=1), where f is the compression factor, count[x] is the counter value associated with quantized value x, and totalNumberObservedSamples is the sum of the set of counters.

Note that by compressing the counter values, the system reduces the inertia buildup in the statistical distribution. The choice of the compression factor determines how much affect it has on the inertia buildup. A low compression factor reduces the weight of the previously received quantized signal values in computing the statistical distribution, which makes the statistical distribution more sensitive to new signal values. On the other hand, a high compression factor can increase the weight of the previously received quantized signal values in computing the statistical distribution, which makes the statistical distribution less sensitive to new signal values.

For example, assume that during a drift-detection process, a counter associated with a particular quantized value counter has counted 100 samples when a threshold of 1000 is reached. The frequency of this quantized value is computed as $100/1000=10\%$. We represent the statistical data for a quantized value using the triplet (quantized value count, total number count, frequency). For example, the statistical data for the quantized value described above can be expressed as (100, 1000, 10%). Next, let us assume that the system compresses the counters. Consider two cases corresponding to compression factors 0.5 and 0.9. A 0.5 compression factor would adjust the statistic to (50, 500, 10%), while a 0.9 compression factor would adjust the statistic to (90, 900, 10%). (Note that the frequency—10%—does not change due to compression.) After compression, a new sample is received which has the same quantized value. Then, for a compression factor of 0.5, the statistics changes to (51, 501, 10.2%) whereas for a compression factor of 0.9, the statistics changes to (91, 901, 10.1%) depending on the compression factor. Note that the new frequency value (10.2%) for compression factor 0.5 is more than the new frequency value (10.1%) for compression factor 0.9. This means that a lower compression factor, such as 0.5, causes the system to be more sensitive to new samples than a higher compression factor, such as 0.9.

After compression, samples continue to accumulate in the counters until the threshold is reached again, at which point compression is again performed in the same way as described above.

Note that using the compression factor eliminates the memory required in the sliding window approach and also avoids the inertia buildup problem. This is because the present invention keeps track of the statistical distribution using only counters and frequency values. Further, the present invention does not require a buffer to queue samples. Moreover, since a quantized signal typically can only take a small number of distinct values, the present invention only needs to store a few counters and frequencies. In contrast, the sliding window approach needs to maintain not only the counters and frequencies required by the present invention, but also memory buffers for queuing the received quantized values. For example, a threshold of 10,080 samples requires a buffer to store 10,080 floating point numbers, or roughly 40 KB. This memory requirement becomes even more problematic when multiple signals are monitored, each requiring a separate buffer.

Continuing with the flow chart shown in FIG. 2, the system then compares the present statistical distribution with a reference distribution of the quantized signal values which is associated with normal operation of the computer system (step 212).

In one embodiment of the present invention, prior to identifying drift in the signal, the system generates the reference statistical distribution by computing the mean and variance of quantized values received over a predetermined period of time. The predetermined period is referred to as the "training period."

The system then determines if a drift in the signal is occurring based on the results of the above comparison (step 214).

In one embodiment of the present invention, the system performs the comparison using SPRT test to determine, with predetermined false-alarm and missed-alarm probabilities, whether the reference distribution which constitutes a Nonfailure hypothesis, or whether the present statistical distribution follows a deviant distribution which constitutes a Failure hypothesis. Note that a false-alarm occurs when a Failure hypothesis determination is made under Nonfailure hypothesis conditions, and a missed-alarm occurs when a Nonfailure hypothesis determination is made under Failure hypothesis conditions.

Further, note that the system performs a SPRT test and makes a Failure/Nonfailure hypothesis for each new sample. However, the system may not determine a drift based on one SPRT test result. Instead, the system typically determines a drift based on the results of a string of consecutive SPRT tests. In one embodiment of the present invention, the system determines a drift in a signal only when 7 out of 12 consecutive SPRT tests indicate the Failure hypothesis to be true.

If the system identifies a drift, it may then take appropriate action (step 216). In one embodiment of the present invention, the system can compute the severity index of the drift based on how fast the current distribution is deviating from the reference distribution. The system may take appropriate actions based on the index, e.g., sending alarm indicating a hardware failure.

If the system does not identify a drift in step 214, the monitoring process typically continues and the process flow restarts from step 200.

In a further embodiment of the present invention, the system determines the compression factor based on the expected behavior of the SPRT test. Ideally, we want the SPRT test results to have the lowest false-alarm and missed-alarm probabilities. However, note that increasing the compression factor will increase the number of missed-alarms whereas decreasing the compression factor will increase the number of false-alarms. Consequently, the compression factor can be tuned so that the false-alarm and missed-alarm probabilities meet user-specified targets.

Adjusting a Statistical Distribution Using Compression

FIGS. 3A, 3B, 3C, and 3D illustrate how compression can be used to adjust a statistical distribution for a sequence of quantized signal values in accordance with an embodiment of the present invention.

A sequence of quantized signal values are received at fixed time intervals of unit 1 (step 300). There are 4 possible quantized values: 1.42, 1.43, 1.44, and 1.45. At T=1, the first quantized value of 1.42 is received. We then start to construct the statistical distribution for the 4 values in the form of a histogram. Specifically, in FIG. 3A, for each quantized value, the height of a bar associated with each value presents both the number counts of this value received (denoted by a number on each bar) and the frequency of occurrences of this value over the total number of samples (SUM) received (denoted by a percentage value immediately above the bar).

FIG. 3A represents the histogram at T=10 when ten samples have been received (SUM=10). Each bar in the histogram can be denoted by three numbers, namely, quantized value, number count, and frequency. Using this notation, the distribution at T=10 is (1.42, 5, 50%), (1.43, 1, 10%), (1.44, 3, 30%), and (1.45, 1, 10%).

FIG. 3B illustrates the histogram at T=1000 when 1000 samples have been received which is also the time when the threshold is reached. At this point, the distribution is (1.42, 150, 15%), (1.43, 250, 25%), (1.44, 500, 50%), and (1.45, 100, 10%).

Since the threshold is 1000, compression takes place and the histogram is multiplied by a compression factor of 0.5, meaning half of the older samples received are discarded for each quantized value. FIG. 3C illustrates the adjusted histogram at T=1000 after compression has been performed. The new distribution is now (1.42, 75, 15%), (1.43, 125, 25%), (1.44, 250, 50%), and (1.45, 50, 10%). Note that each quantized value count has been reduced by half. The total numbers of samples (SUM=500) has also been reduced by half. Note that the statistical distribution represented by the frequencies is unchanged before and after the compression process.

Finally, FIG. 3D illustrates the histogram at T=1001 when this first new sample value 1.45 is received right after the compression. The new distribution is now (1.42, 75, 14.97%), (1.43, 125, 24.95%), (1.44, 250, 49.9%), and (1.45, 51, 10.18%) with SUM=501. The new samples continue to be received until the threshold is reached again at time T=2000.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying a drift in a signal in a computer system, the method comprising:
receiving a sequence of quantized signal values of the signal;
generating a statistical distribution based on the sequence of quantized signal values, wherein the statistical distribution is generated using a set of counters, wherein each counter keeps track of the number of occurrences of an associated quantized signal value;
if the sum of the set of counters is greater than or equal to a threshold, adjusting the counters by multiplying each counter in the set of counters by a compression factor; and
identifying the drift in the signal by comparing the statistical distribution with a reference statistical distribution of the quantized signal values, wherein the reference statistical distribution is generated by computing the mean and variance of the quantized signal values received over a predetermined time period during normal operation of the computer system.

2. The method of claim 1, wherein generating the statistical distribution involves:
incrementing a counter associated with a quantized signal value when the quantized signal value is received; and
computing a frequency value associated with the quantized signal value by dividing the counter by the sum of all the counters in the set of counters;
wherein using counters to keep track of the statistical distribution eliminates the need for storing the quantized signal values in a buffer.

3. The method of claim 1, wherein multiplying the set of counters by the compression factor does not change the statistical distribution.

4. The method of claim 1, wherein the compression factor is a value between 0 and 1;
wherein a compression factor closer to 0 reduces the weight of the previously received quantized signal values in computing the statistical distribution, thereby making the method more sensitive to new signal values; and
wherein a compression factor closer to 1 increases the weight of the previously received quantized signal values in computing the statistical distribution, thereby making the method less sensitive to new signal values.

5. The method of claim 2, wherein prior to identifying a drift in the signal, the method further comprises obtaining the reference statistical distribution by computing a mean and a variance of a frequency associated with a quantized value for a predetermined period of time during normal system operation.

6. The method of claim 1, wherein identifying the drift in the signal involves using a Sequential Probability Ratio Test (SPRT) to determine whether the sequence of quantized signal values adheres to a reference distribution or not.

7. The method of claim 6, further comprising tuning the compression factor so that the SPRT test meets user-specified false-alarm and missed-alarm probability targets;
wherein a false-alarm occurs when a drift determination is made under non-drift conditions;
wherein a missed-alarm occurs when a non-drift determination is made under drift conditions.

8. A computer-readable storage medium storing instructions that when executed by a computer cause the computer to perform a method for identifying a drift in a signal in a computer system, the method comprising:
receiving a sequence of quantized signal values of the signal;
generating a statistical distribution based on the sequence of quantized signal values, wherein the statistical distribution is generated using a set of counters, wherein each counter keeps track of the number of occurrences of an associated quantized signal value;
if the sum of the set of counters is greater than or equal to a threshold, adjusting the counters by multiplying each counter in the set of counters by a compression factor; and
identifying the drift in the signal by comparing the statistical distribution with a reference statistical distribution of the quantized signal values, wherein the reference statistical distribution is generated by computing the mean and variance of the quantized signal values received over a predetermined time period during normal operation of the computer system.

9. The computer-readable storage medium of claim 8, wherein generating the statistical distribution involves:
incrementing a counter associated with a quantized signal value when the quantized signal value is received; and computing a frequency value associated with the quantized signal value by dividing the counter by the sum of all the counters in the set of counters;

wherein using counters to keep track of the statistical distribution eliminates the need for storing the quantized signal values in a buffer.

10. The computer-readable storage medium of claim 8, wherein multiplying the set of counters by the compression factor does not change the statistical distribution.

11. The computer-readable storage medium of claim 8, wherein the compression factor is a value between 0 and 1;

wherein a compression factor closer to 0 reduces the weight of the previously received quantized signal values in computing the statistical distribution, thereby making the method more sensitive to new signal values;

wherein a compression factor closer to 1 increases the weight of the previously received quantized signal values in computing the statistical distribution, thereby making the method less sensitive to new signal values.

12. The computer-readable storage medium of claim 9, wherein prior to identifying a drift in the signal, the method further comprising obtaining the reference statistical distribution by computing a mean and a variance of a frequency associated with a quantized value for a predetermined period of time during normal system operation.

13. The computer-readable storage medium of claim 8, wherein identifying the drift in the signal involves using a Sequential Probability Ratio Test (SPRT) to determine whether the sequence of quantized signal values adheres to a reference distribution or not.

14. The computer-readable storage medium of claim 13, wherein the method further comprises tuning the compression factor so that the SPRT test meets user-specified false-alarm and missed-alarm probability targets;

wherein a false-alarm occurs when a drift determination is made under non-drift conditions;

wherein a missed-alarm occurs when a non-drift determination is made under drift conditions.

15. An apparatus for identifying a drift in a signal in a computer system, comprising:

a receiving mechanism configured to receive a sequence of quantized signal values of the signal;

a generating mechanism configured to generate a statistical distribution based on the sequence of quantized signal values, wherein the statistical distribution is generated using a set of counters, wherein each counter keeps track of the number of occurrences of an associated quantized signal value;

an adjusting mechanism, wherein if the sum of the set of counters is greater than or equal to a threshold, the adjusting mechanism is configured to adjust the counters by multiplying each counter in the set of counters by a compression factor; and an identifying mechanism configured to identify the drift in the signal by comparing the statistical distribution with a reference statistical distribution of the quantized signal values, wherein the reference statistical distribution is generated by computing the mean and variance of the quantized signal values received over a predetermined time period during normal operation of the computer system.

16. The apparatus of claim 15, wherein the generating mechanism is configured to:

increment a counter associated with a quantized signal value when the quantized signal value is received; and to compute a frequency value associated with the quantized signal value by dividing the counter by the sum of all the counters in the set of counters;

wherein using counters to keep track of the statistical distribution eliminates the need for storing the quantized signal values in a buffer.

17. The apparatus of claim 15, wherein multiplying the set of counters by the compression factor does not change the statistical distribution.

18. The apparatus of claim 15, wherein the compression factor is a value between 0 and 1;

wherein a compression factor closer to 0 reduces the weight of the previously received quantized signal values in computing the statistical distribution, thereby making the method more sensitive to new signal values;

wherein a compression factor closer to 1 increases the weight of the previously received quantized signal values in computing the statistical distribution, thereby making the method less sensitive to new signal values.

19. The apparatus of claim 16, wherein the apparatus is configured to obtain the reference statistical distribution by computing a mean and a variance of a frequency associated with a quantized value for a predetermined period of time during normal system operation.

20. The apparatus of claim 15, wherein the identifying mechanism is configured to use a Sequential Probability Ratio Test (SPRT) to determine whether the sequence of quantized signal values adheres to a reference distribution or not.

21. The apparatus of claim 20, wherein the apparatus is configured to tune the compression factor so that the SPRT test meets user-specified false-alarm and missed-alarm probability targets;

wherein a false-alarm occurs when a drift determination is made under non-drift conditions;

wherein a missed-alarm occurs when a non-drift determination is made under drift conditions.

* * * * *